United States Patent Office 3,520,021
Patented July 14, 1970

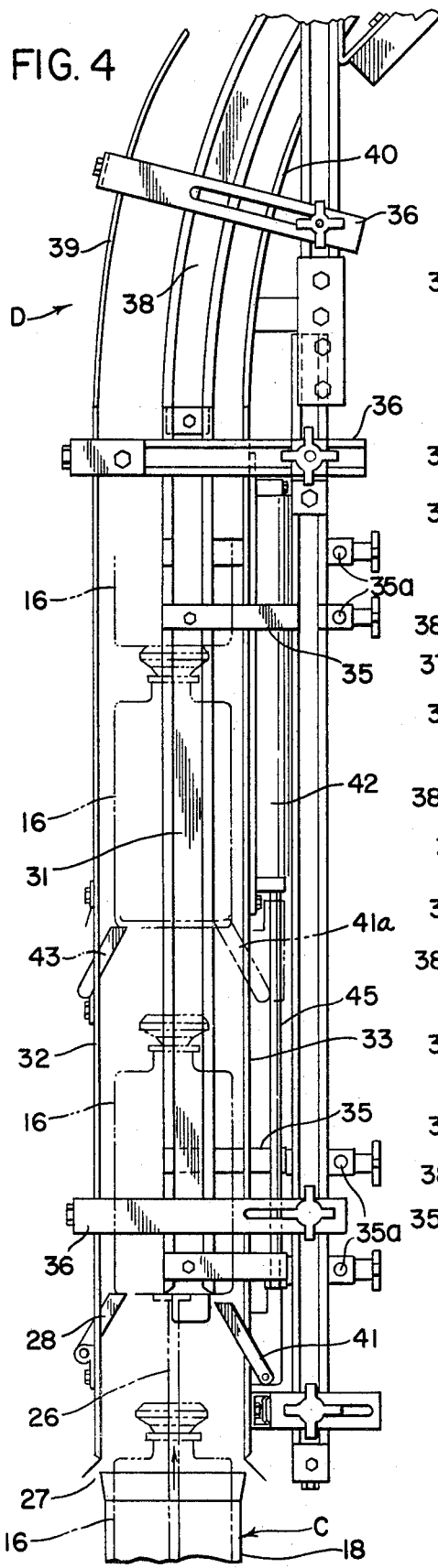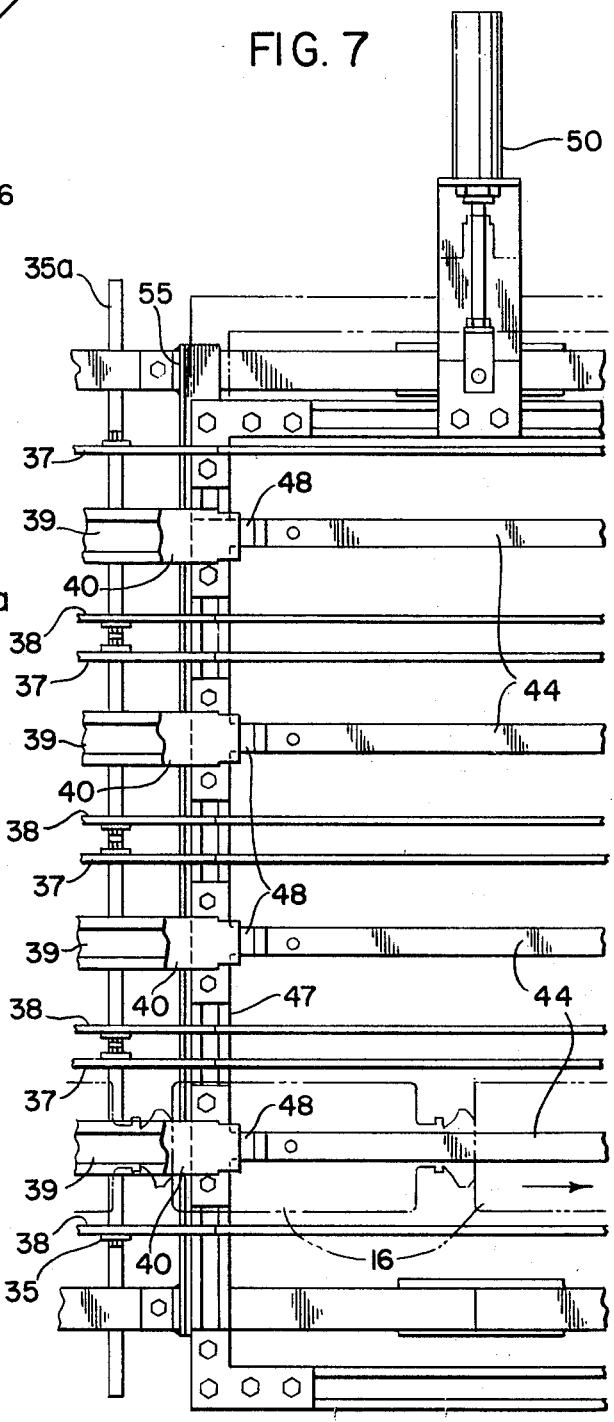

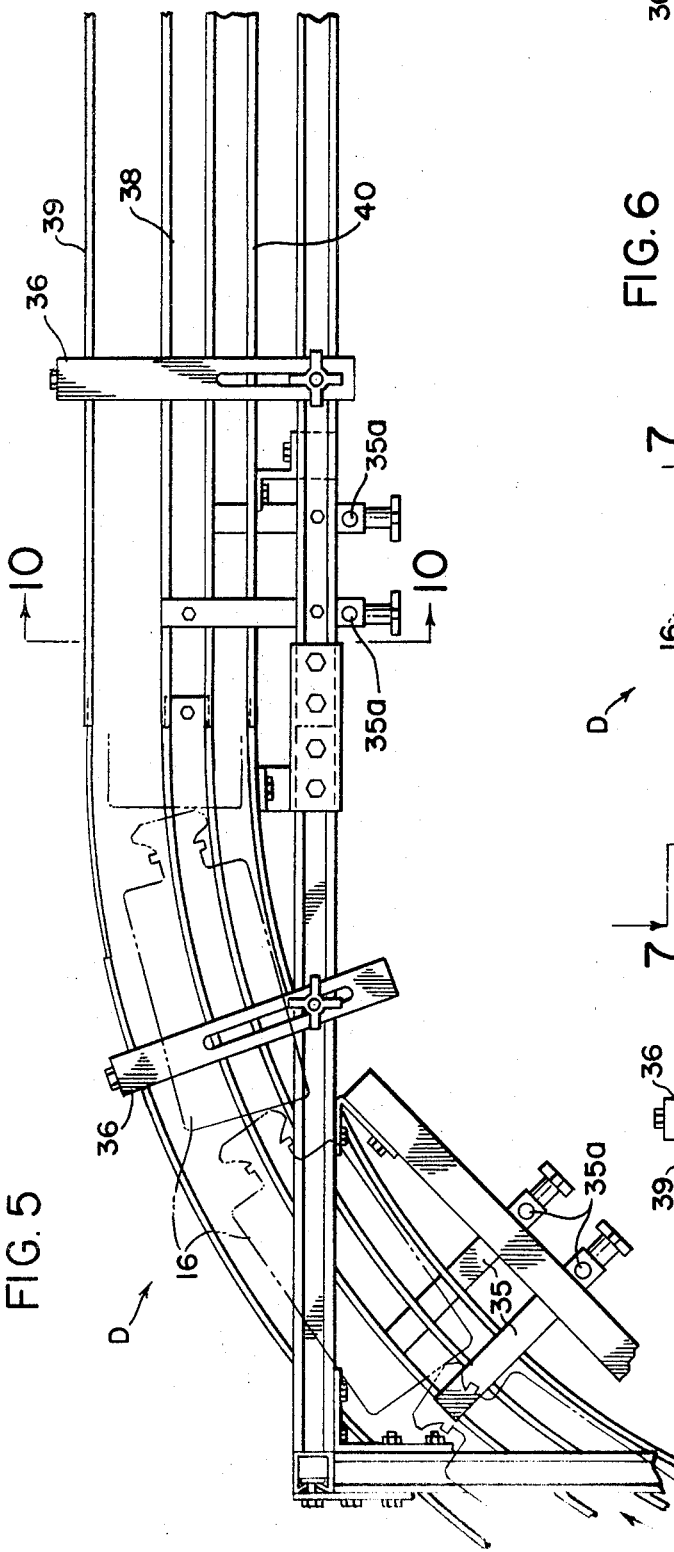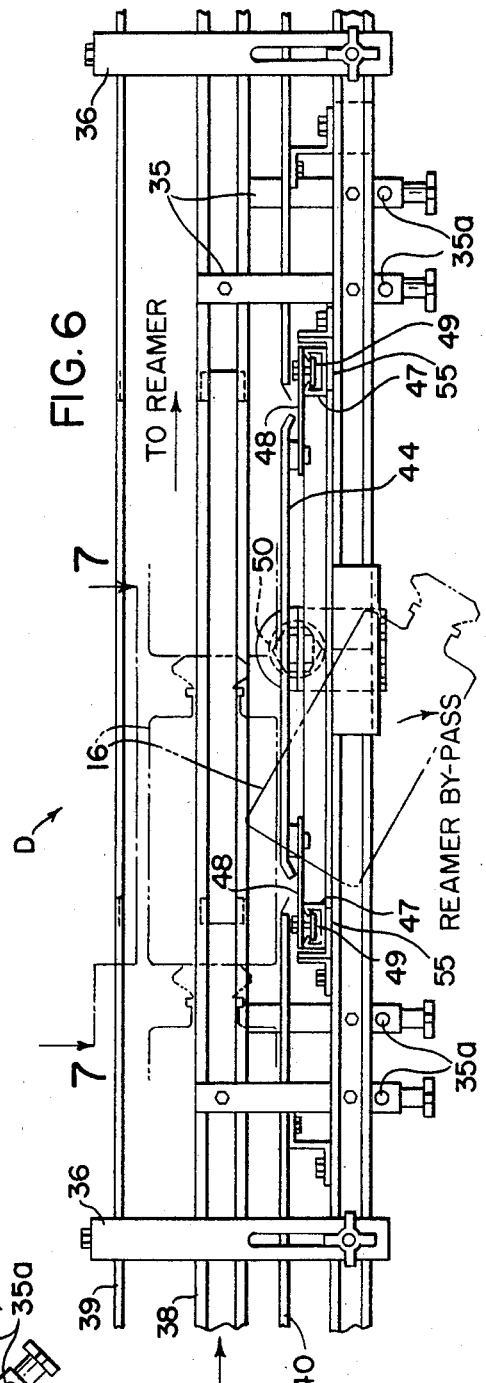

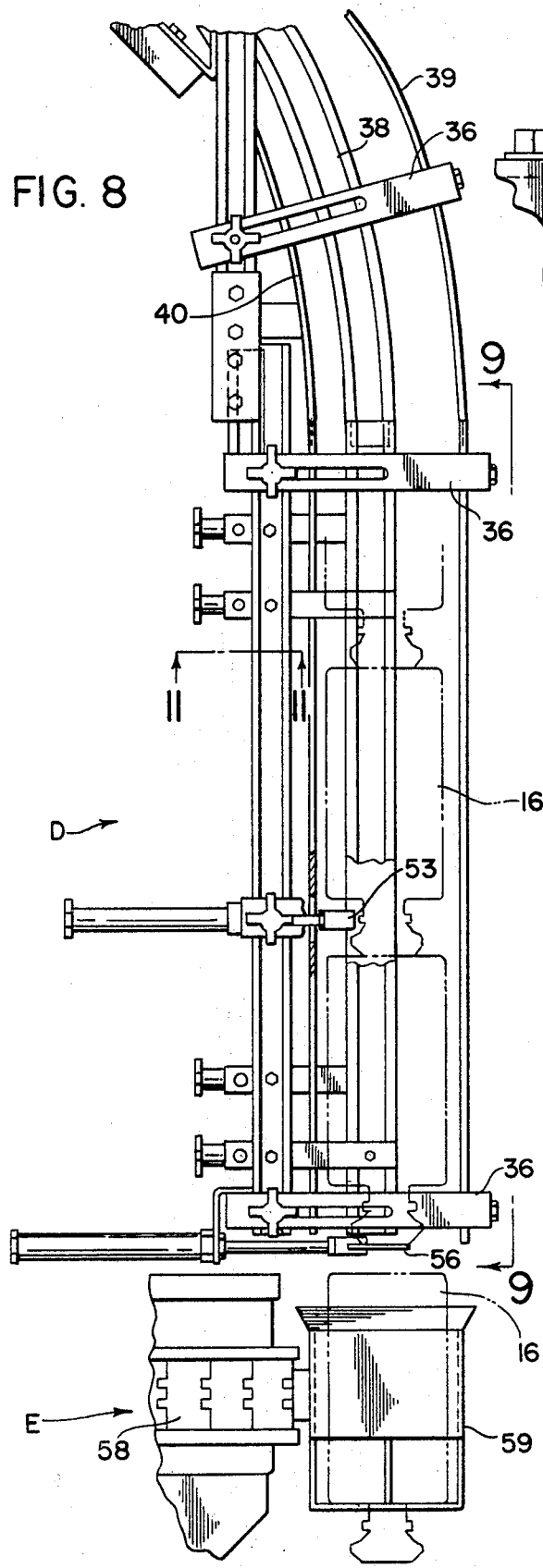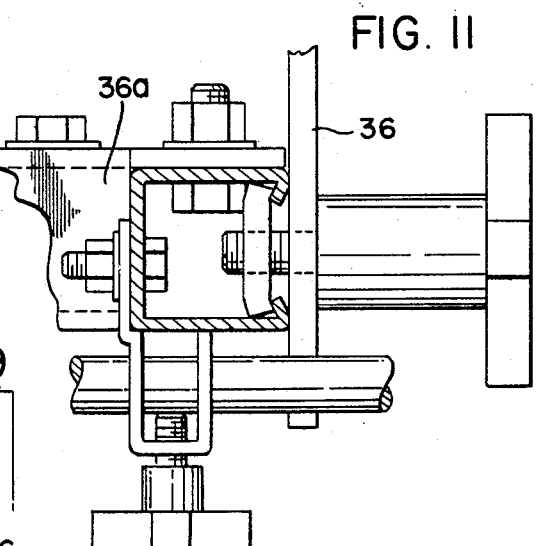

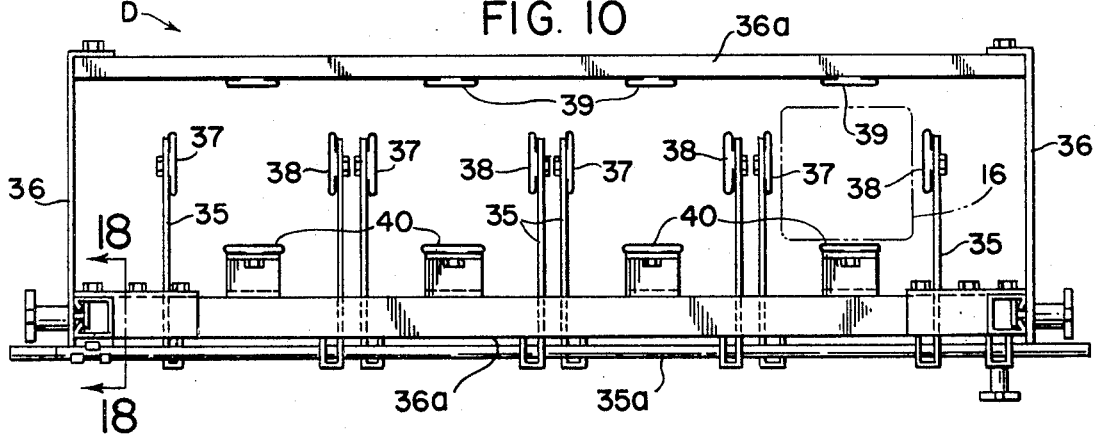
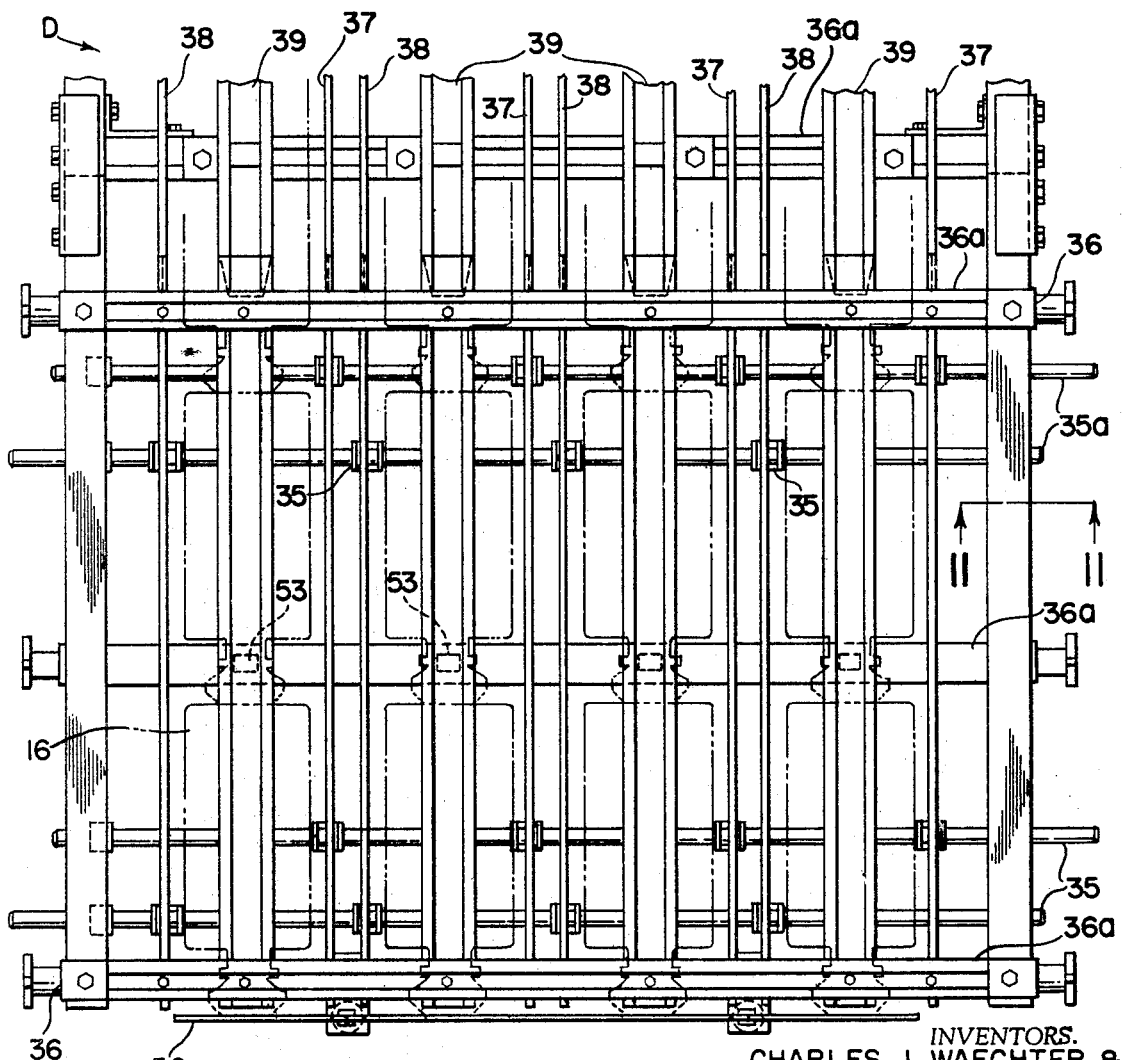

3,520,021
APPARATUS FOR THE CONTINUOUS MANUFACTURE OF BLOW-MOLDED ARTICLES
Charles J. Waechter, Piscataway, and Lloyd Kovacs, Somerset, N.J., assignors to Midland-Ross Corporation, Cleveland, Ohio, a corporation of Ohio
Filed Feb. 1, 1967, Ser. No. 613,322
Int. Cl. B29c 17/07; B26d 7/06
U.S. Cl. 18—5                                   4 Claims

ABSTRACT OF THE DISCLOSURE

A continuously operating worm extruder simultaneously forms a plurality of plastic parisons which are blown into jugs to be fed to a milk filling station. The extruded jugs are continuously formed, deflashed, automatically transferred in an up-ended position to a neck shearing and cleaning apparatus thence passed on to temporary storage or to a filling station.

---

This invention relates to an apparatus for the continuous manufacture of and simultaneous transfer of hollow articles, as bottles or jugs, from a plastic material base deflashed and neck trimmed to an ultimate station where the hollow articles can be filled with a flowable material, or placed in temporary storage prior to use.

By way of an example, the milk industry is particularly adaptable to utilizing a continuously operating apparatus manufacturing jugs in desired sizes and numbers out of plastic and forwarding them automatically to a milk filling area, or to a temporary storage bin for subsequent filling. An important advantage is that pluralities of bottles or jugs can be simultaneously manufactured when desired in needed quantities and in sterile condition since no human need touch any of the product. Valuable storage space is eliminated as well as the step of cleaning and sterilization. A further advantage is that the apparatus is flexible in that it can be positioned in a milk filling plant being adapted to be tied-in directly with a filling machine, or diverted to temporary storage, and it can be operated only when necessary.

The advantages and novel features will be more apparent from the following description where:

FIG. 4 is an elevation of the forwarding section of the auto-transfer;

FIG. 5 is a continuation of FIG. 4 beyond the elbow;

FIG. 6 is a continuation of FIG. 5;

FIG. 7 is a fragmentary plan view of FIG. 6 taken on line 7—7;

FIG. 8 is a continuation of the conveyer in FIG. 6;

FIG. 9 is an elevation taken on FIG. 8, line 9—9;

FIG. 10 is a section through FIG. 5 of lines 10—10; and

FIG. 11 is an enlargement of FIG. 10 taken on lines 11—11 of FIG. 8.

Figure 1:
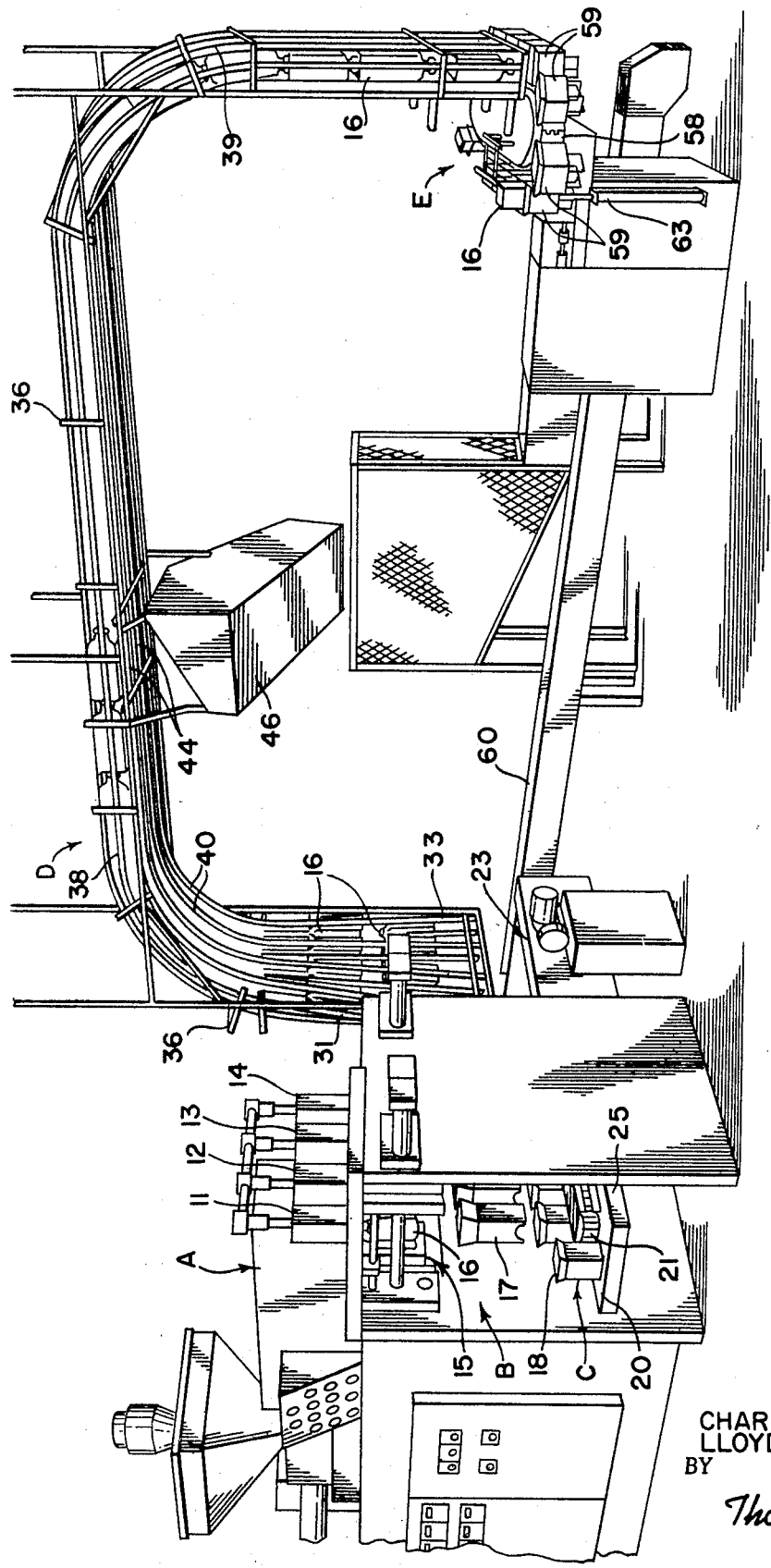
FIG. 1 is a general perspective view of the apparatus from molding through finishing the hollow articles made ready for filling, or storage.

Referring to the general disclosure of FIG. 1, an extruder A continuously forms a plurality of, say four half-gallon jugs 16, adapted to store a liquid such as milk for resale, by means of a multihead mold 15 in mold area B, then dropping the jugs 16 through guides 17 into a carrier C having a number of receiving stations 18 and which carrier C conducts them over a detabbing unit (in the carrier C but not shown) to a transfer means D. In traveling through the auto-transfer section D the jug position 16 is desirably reversed from normal to upside down so that the neck portion is properly downwardly presented to a neck-trimming station for subsequent deflashing, cleaning, and shearing at terminal unit E, from whence the jugs are further forwarded or thrust onto a milk-filling station, or to storage. The carrier C including the deflashing means and the neck trimming unit E form the matter of separately filed copending applications so that they are only generally included herein.

Now, more specifically, the extruded A, a worm screw type, continuously compacts, melts and then expels a desirable thermoplastic material through its multiple extruding dies 11–14 (generally indicated), forming four generally cylindrical parisons which are seized by an awaiting mold 15 wherein they are expanded by an injection of air into hollow half-gallon jugs 16 (one shown). The extruder A and its operation, the mold 15 and the blowing of the parisons in the mold, are generally and intimately known so that no detailed explanation of them is thought necessary here. However, the continuous production, deflashing, handling, automatic conveyance of the blown jugs from their expulsion out of the mold to a neck shearing or trimming station and from there to a final delivery to an end use source such as a filling station is deemed novel and patentable.

Reverting to FIGS. 1 and 2 and to the mold section B there is positioned below the opened multiheaded mold 15 in jug receiving relationship a carrier C with a plurality of indexing rectangular jug holders 18 fastened to the movable endless belt 21 mounted and operating about end wheels 22 on a horizontal table 20. The rectangularly shaped jugs are dropped through intervening, indexing rectangular chutes 17 into rectangular holders 18. The four unfinished jugs 16 have base flash and unfinished necks which must be deleted and finished. The jugs are then carried over a deflashing station that is advantageously positioned in the table 20 supporting the carrier C, thence into a subsequent position from which they are advanced into and through the transfer means D. illustrated in FIGS. 1, 2, 5, 8 as a curved guideway.

A jug 16, as it is formed, has excess plastic material on the exterior of its base and in its neck area. Each such excess must be removed. Generally, the removal is done in separate operations since parts or sections of the jug are not yet chilled sufficiently to permit simultaneous trimming operations. The larger surface or the body of the jug cools more rapidly then its neck portion. Because of this a time interval must be provided for neck cooling and resultant shrinkage with size change and yet maintain the operation continuously. Therefore, the time required for neck cooling is provided by the transfer means D. After flash removal cooling time and simultaneous reversing of the positions of the jugs or bottles, as the case may be, are effected by the transfer to properly present the jugs in a hardened condition and neck down to the neck-trimming apparatus E.

Figure 2:
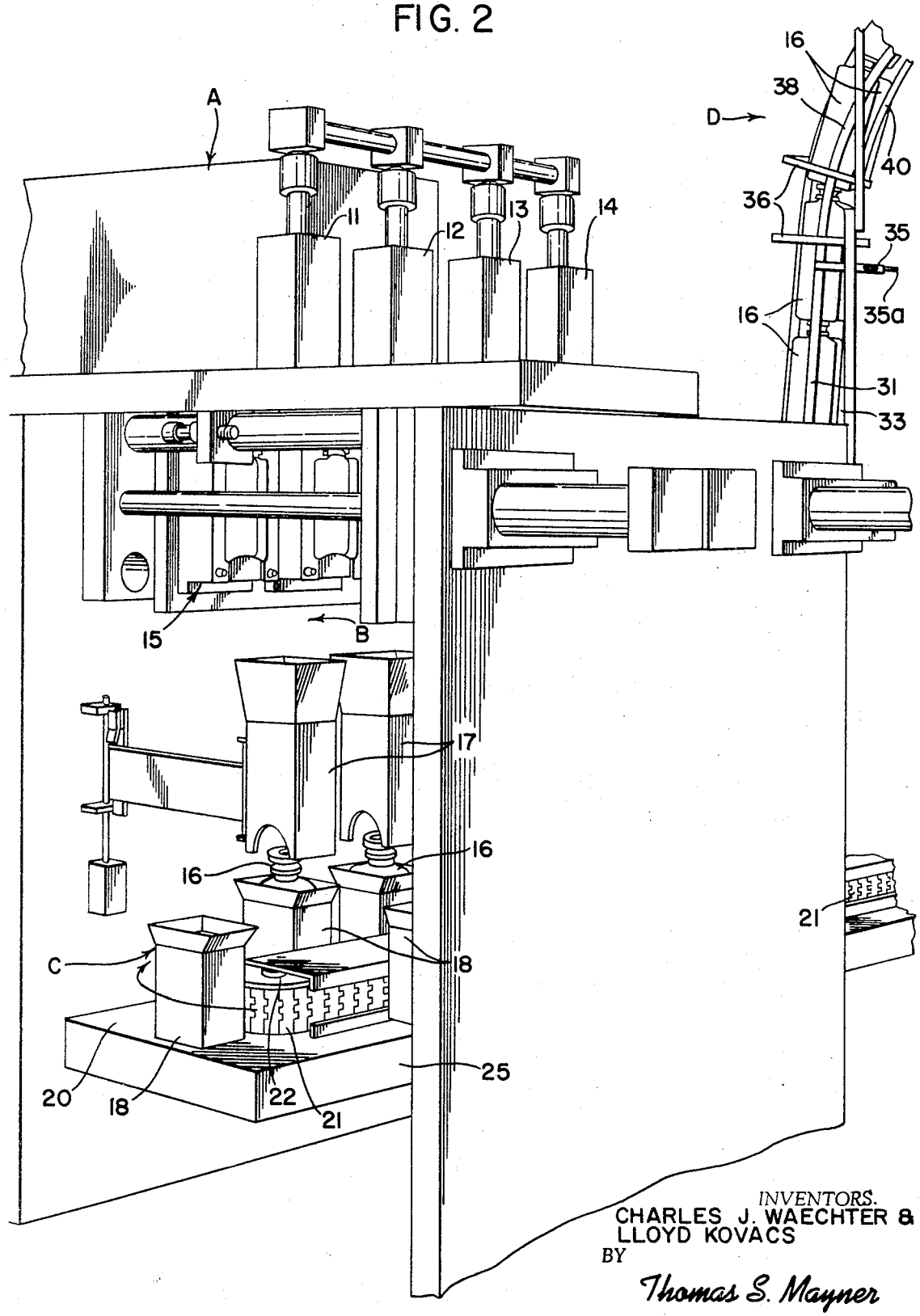
FIG. 2 is an enlarged fragmentary perspective view, in elevation, of the molding head and chutes, and endless conveyor to a deflashing station.
Figure 3:
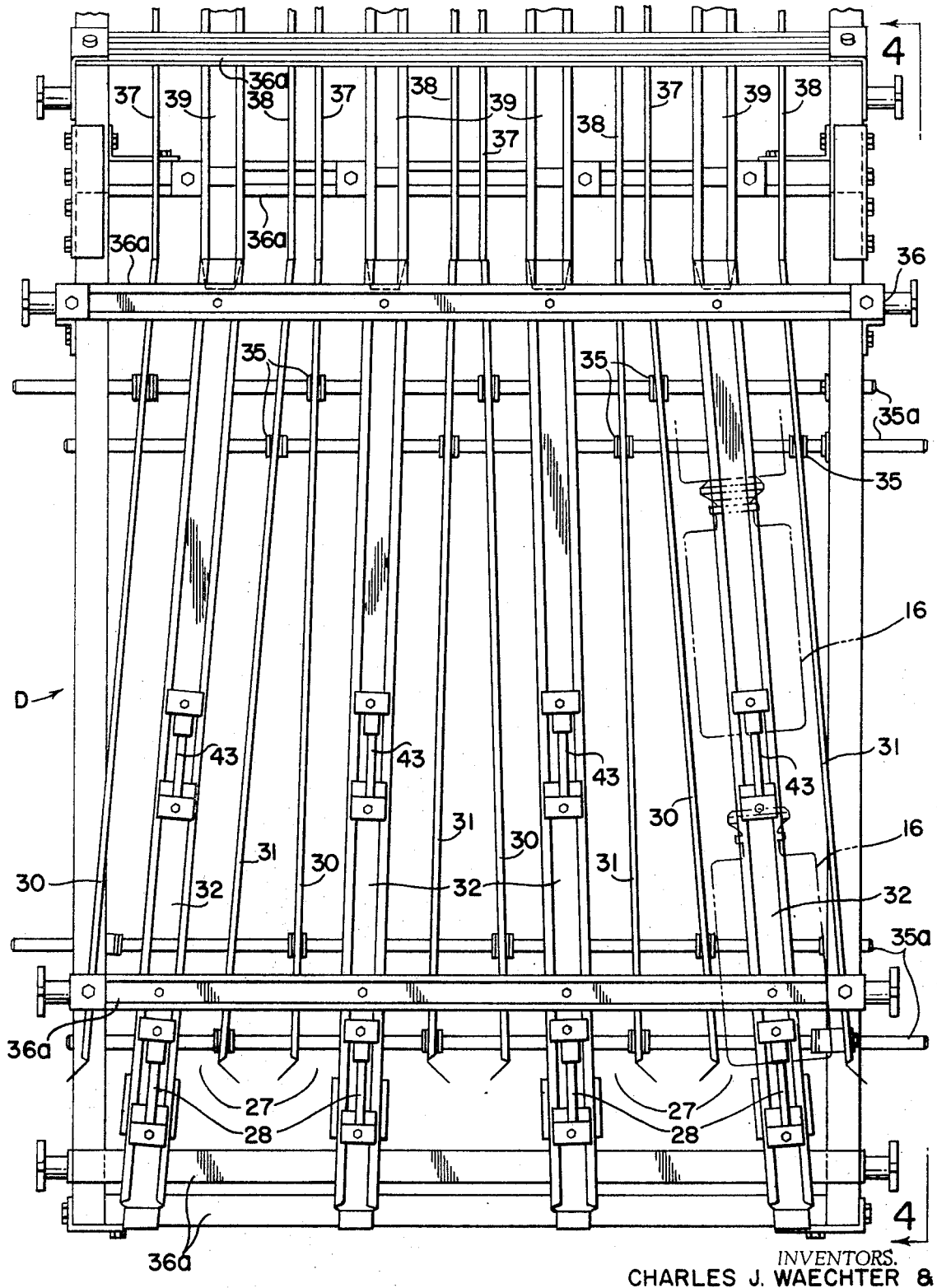
FIG. 3 is an elevation of an auto-transfer push conveyer.

In FIG. 2 the formed jug 16 is shown in an upright position inside its indexing, receiving bucket 18. The buckets 18 carry four jugs at a time over the flash remover in table 20. The table 20 of the deflashing unit C supports the endless belt 21 as well as its motivating mechanism and, also, a flash removing unit 23 (generally shown in FIG. 1). Upon removal of the flash while in motion over the table 20 the jugs are subsequently aligned under their respective transfer guiding rails 30, 31 side and 32, 33 top and bottom of the auto-transfer means D as seen in FIGS. 3 and 4. Each jug 16 upon reaching its position under the flared entry 27 is simultaneously lifted by air actuated lifters 26 acting on a jug's base. Each jug 16 is raised through such guideway 27 to a first nonreturn position above and rests on a pivoted member 28 and/or 41. As the jugs 16 are raised the eccentrically positioned members 28, 41 pivot aside to again swing inwardly to provide a base support for the jugs when the pneumatically actuated lifter 26 is withdrawn. The pneumatic lifter 26 is merely a rod with a pad attached to an air piston that is raised by air pressure.

The transfer conveyor D (FIG. 10) itself is formed of similar spaced opposing adjustable metal bars 37, 38 and of similar spaced lengthy crimped metal sections 39, 40 supported in a rectangular frame formed of side brackets 36 and transverse channels 36a so as to be transversely adjustable to accommodate changes in sizes of jugs or bottles to be handled. The rod sides 30, 31 and metal front and back sections 32, 33 are secured in position in the laterally adjustable guides 35 on transverse rods 35a. The initial vertical guideway section of the auto-transfer unit D merges with similar guideway forming elements 37, 38, 39, 40 after passing the curved position changing into a horizontal then again to a downwardly curved position. While the transfer system is described as comprising an open rectangular chute or guideway its detail shown structure is to be considered only as one of several ways to support and advance hollow articles from an extruder to and beyond a neck finisher.

The oriented jugs 16 are initially raised or thrust upwardly to the first nonreturn stops 28 and 43 one above the other then, when a following group of four is ready to take their position, another set of lifters 42 raise the preceding jugs by means of attached, pivoted spaced members 41, 41a to a forward position, only the upper jugs being placed in contact with the one ahead. The pivoted members 41, 41a are attached to and spaced on piston rod 45 of pneumatic lifter 42. The jugs are raised to rest on fixed spaced latches 28 and 43. It was hereinbefore stated, as shown in FIGS. 3 and 4, that the base jug just raised is free of top contact with an immediately preceding jug since its neck section at this time is still quite plastic and deformable on contact. The time interval required for the refilling of the buckets 18 with another four and rotation of the belt 21 carrying a successive four to the position of upward thrust is sufficient to cool the raised jugs so that those cooled can be raised and used to push those ahead. Since the mold 15 has a capacity of four jugs at a time this interval is used for the subsequent forwarding operation of the belt 21, being based on four stops. All four jugs are moved about to a forwarding stop position and all four are raised simultaneously by the lifters 26 and 42 placing jugs in respective transfer guideways 37–40. The jugs 16 then are pushed on up and over onto a horizontal section (FIGS. 4–6) filling the several guideways until they reach the downward section of the automatic transfer unit D in a neck-down position where they automatically by gravity drop onto a stop and there held in abeyance until released by the neck trimmer apparatus E.

If every section of the combination being described were without eventual possible problems to stop the automatic operation the extruder would continue to make jugs which, in turn, would be detabbed then forwarded by the transfer means to the neck forming and reaming apparatus and from thence to a liquid filling station. Obviously, this is hardly possible so planning must be made for exigencies. Once such is a bottle diversion means incorporated in the transfer means D to permit a continual bypass of the jugs until the terminal difficulty is solved. Since the transfer section itself is troublefree then the receiving neck shearing and cleaning apparatus or its ejection means are subject to some fault. Once an extruder is in operation it would be inadvisable and too expensive to stop it unless a desired production run is completed. To keep it in operation although some subsequent difficulty appears in end equipment there is provided an intermediate shiftable gate-like section 44 (see FIGS. 6 and 7) of the transfer guideway. This section 44 is made laterally displaceable out of its normal alignment to provide escape openings along the underside of the guideway designed to drop the onwardly pushed jugs 16 into a chute 46 (FIG. 1) feeding to a temporary storage bin. The gate section 44 is unitized and can be laterally displaced either manually or automatically by means of a signal to an electrical or pneumatic actuator 50 allowing the jugs to drop into the chute 46 below, as shown in FIG. 1, into temporary storage.

As shown in FIGS. 1, 6 and 7, the section 44 is positioned about midway in the auto-transfer between the detabbing unit and the neck trimmer. This midsection 44 is unitized for total lateral movement. The former base guiding member 39 is now continuing section 44 secured to lateral member 47 resting in supporting angles 55. The base support elements 44 are secured to the lateral member 47 by means of brackets 48 and fasteners 49 in their ends. The pneumatically operated cylinder 50 positioned adjacent the section pulls the unit 44 in and out of alignment with the rest of the transfer apparatus. The movement of this section of the auto-transfer, advantageously, is tied in with the ability of the neck-reaming apparatus E to operate without difficulty; although separate hand controls can also be provided.

As the jugs approach the downwardly curving section (see FIG. 8) they drop by gravity onto an intercepting pneumatically operated stop 53; such a stop 53 is provided for each of the four transfer guideways. The stops 53 hold back each line of jugs 16 after the preceding group of four resting on a further transverse stop 56 are dropped into buckets 59. All jugs are held up by these. The rotating belt 58 carries tripping cams (not shown) which actuate air valves operating the pneumatic stops 53 and 56. Once the bucket carrying belt 58 moves about clearing four bucket spaces a cam impresses the stop 56 into operation, since its normal position is extended, it is withdrawn to drop another four jugs into empty buckets. A moment later the stop 56 is back in its hold position and the first hold or stop 53 being temporarily withdrawn resumes its normally extended position between the preceding jug base and the next space which allows a further set of jugs 16 to take final position. The jugs 16 are now neck down in the buckets and each is in a position to have it trimmed.

The excess jug neck material desirably is automatically removed as they rotate with the belt 58 being stopped temporarily at the trimming station E (not shown). Once the neck is trimmed the jug is immediately thrust out of its bucket 59 by means of a pneumatic ejector 63, ready for whatever use it may be intended. While the filling operation is not shown it is readily obvious that only another chute to such a station is needed wherein the jug can change its position or otherwise righted to be in readiness for a filling operation.

Scrap material from the tab removing apparatus or of excess flash and from the trimming station E is salvaged and collected by means of traverse conveyer belts from each unit dropping scrap onto an endless belt conveyer 60 which, in turn, drops all of it into a convenient receiver positioned at its end (not shown).

What is claimed is:

1. Apparatus for blow molding, detabbing and neck finishing a series of blow-molded jugs or other necked hollow products comprising:

molding means arranged to discharge jugs downwardly and in an orientation disposing unfinished necks thereof uppermost and in substantially vertical relation with respective closed ends of the jugs with tabs of excess material downwardmost;

a movable carrier comprising jug holders capable of indexing with said molding means to receive jugs therefrom with the tabs thereof projecting underneath the carrier;

deflashing means positioned under the carrier to be passed over by said jug holders in movement of the carrier transferring the jugs to a subsequent jug-discharging station;

a curved guideway for receiving jugs in end-to-end relationship extending upwardly from said carrier at said subsequent station then extending horizontally and then downwardly into overhead relation with a neck-trimming station;

neck-trimming means at the neck-trimming station comprising conveying means and buckets spaced therealong movable into jug-receiving registry with a jug-discharging end of said guideway;

first pushing means acting through said jug holders for transferring jugs into the guideway from jug holders indexed with the guideway;

first laterally resilient stop means on the upward extending portion of the guideway supporting said jugs in the guideway;

releasable stops in the downward extending portion of said guideway for controlling the entry of jugs into said buckets.

2. The apparatus of claim 1 comprising:

a second pushing means and cooperating associated laterally resilient stop means located upwardly along said guideway from said first pushing means and said first stop means for supporting jugs out of contact with jugs supported on said first stop means.

3. The apparatus of claim 1 wherein:

the guideway has an intermediate horizontal portion comprising a movable gate section along the underside of said guideway portion, said gate section being movable to expose an escape opening for jugs.

4. The apparatus of claim 3 comprising:

means responsive to said neck-trimming means for operating said gate section.

References Cited

UNITED STATES PATENTS

| 3,332,109 | 7/1967 | Fischer. |
| 2,984,865 | 5/1961 | Mumford. |
| 3,218,669 | 11/1965 | Barker. |
| 3,270,116 | 8/1966 | Ruekberg. |
| 3,351,981 | 11/1967 | Rupert. |
| 3,377,899 | 4/1968 | Wolford _____ 83—914 X |

WILBUR L. McBAY, Primary Examiner

U.S. Cl. X.R.

83—417, 418, 648, 914